United States Patent
Koyama

(10) Patent No.: US 8,922,861 B2
(45) Date of Patent: Dec. 30, 2014

(54) TWO-DIMENSIONAL OPTICAL DEFLECTOR APPARATUS USING CURVED-TYPE SAW-TOOTH DRIVE VOLTAGES

(75) Inventor: Takaaki Koyama, Kawasaki (JP)

(73) Assignee: Stanley Electric Co., Ltd., Tokyo (JP)

(*) Notice: Subject to any disclaimer, the term of this patent is extended or adjusted under 35 U.S.C. 154(b) by 395 days.

(21) Appl. No.: 13/426,378

(22) Filed: Mar. 21, 2012

(65) Prior Publication Data
US 2012/0243065 A1    Sep. 27, 2012

(30) Foreign Application Priority Data

Mar. 25, 2011   (JP) ................. 2011-067534

(51) Int. Cl.
*G02B 26/08*   (2006.01)
*F21S 8/10*    (2006.01)
*G02B 26/10*   (2006.01)

(52) U.S. Cl.
CPC ......... *F21S 48/1145* (2013.01); *F21S 48/1757* (2013.01); *G02B 26/0858* (2013.01); *G02B 26/101* (2013.01)
USPC ................. 359/199.3; 359/200.7; 359/224.1

(58) Field of Classification Search
CPC ............ G02B 26/0858; G02B 26/101; G02B 26/0833
USPC .................... 359/199.4, 200.7, 221.2
See application file for complete search history.

(56) References Cited

U.S. PATENT DOCUMENTS 8,830,551 B2 *   9/2014   Kitazawa et al. .......... 359/224.1

FOREIGN PATENT DOCUMENTS

JP    2009-223165 A    10/2009

* cited by examiner

*Primary Examiner* — James Phan
(74) *Attorney, Agent, or Firm* — Holtz, Holtz, Goodman & Chick PC

(57) ABSTRACT

In a two-dimensional optical deflector apparatus comprising an optical deflector and a driver for driving the optical deflector, the optical deflector includes a mirror, a first piezoelectric actuator for rocking the mirror with respect to a first axis of the mirror, and a second piezoelectric actuator of a meander type for rocking the mirror with respect to a second axis of the mirror perpendicular to the first axis. The driver generates a curved-type saw-tooth drive voltage and applies the curved-type saw-tooth drive voltage to the second piezoelectric actuator.

12 Claims, 18 Drawing Sheets

PRIOR ART

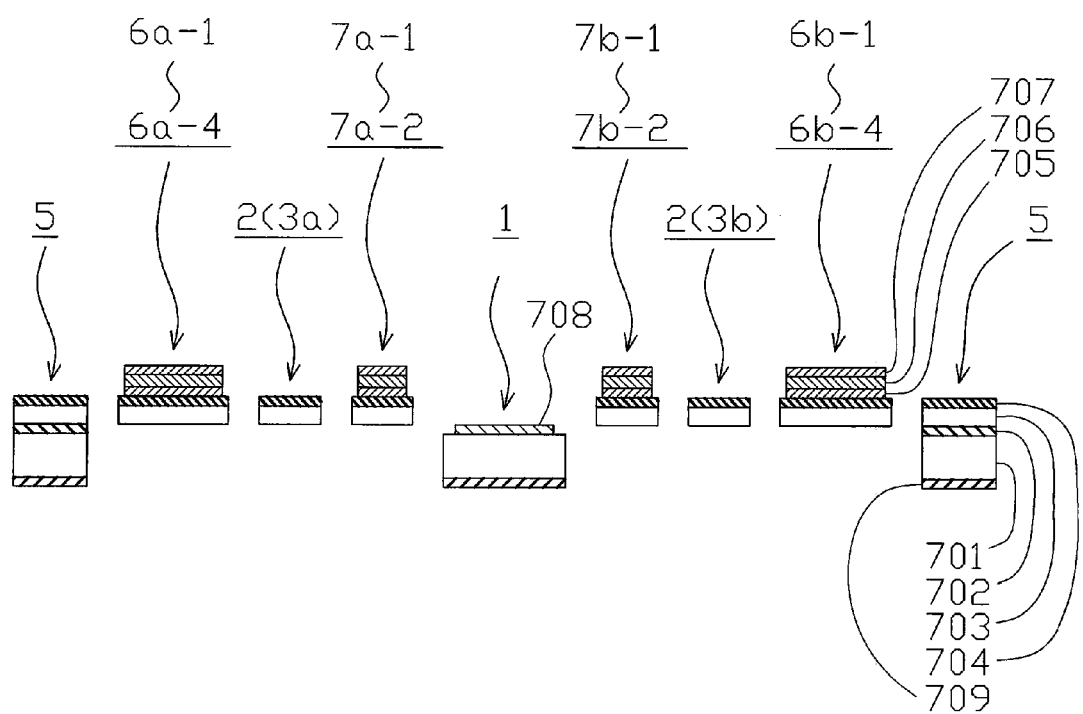

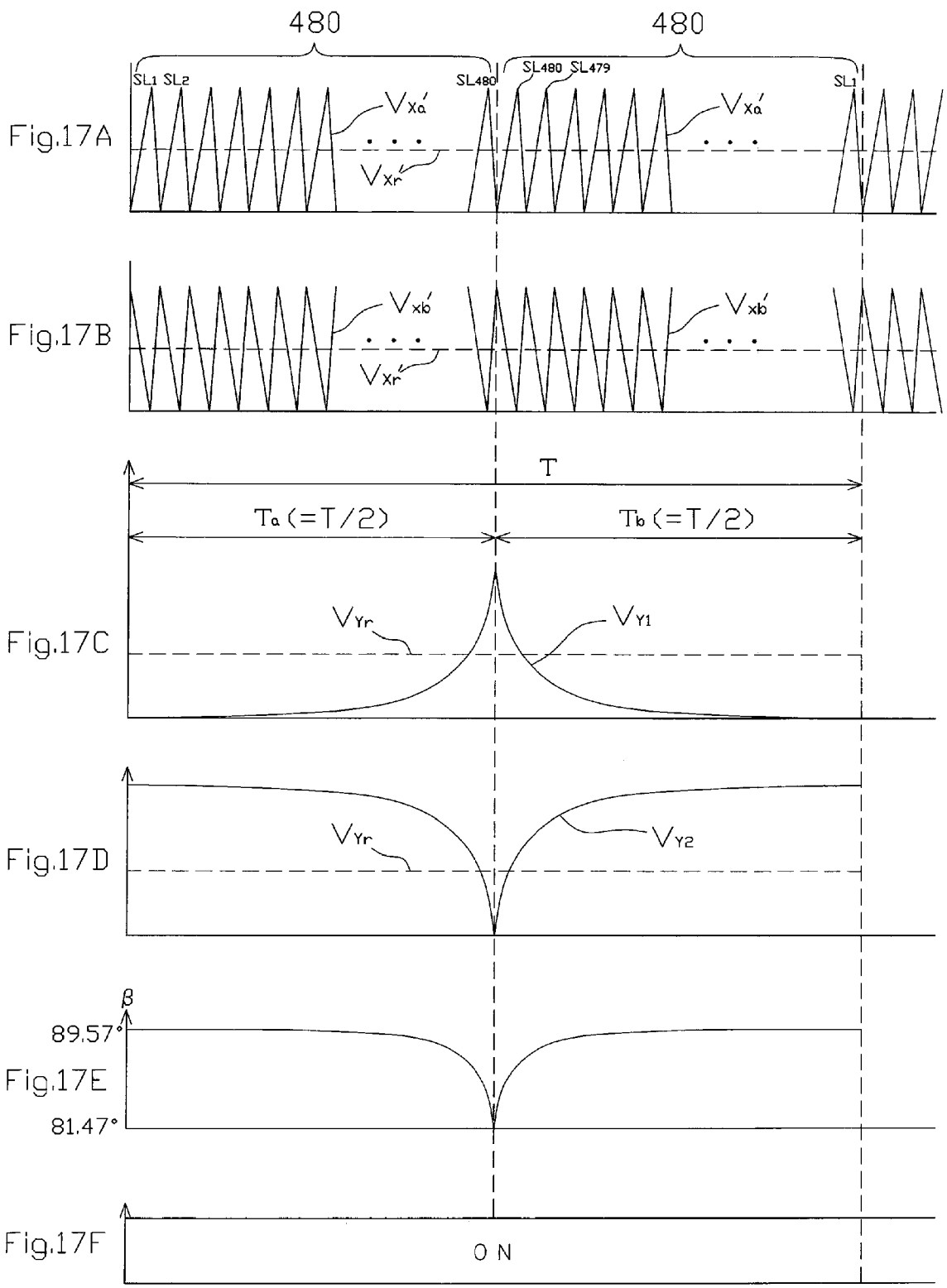

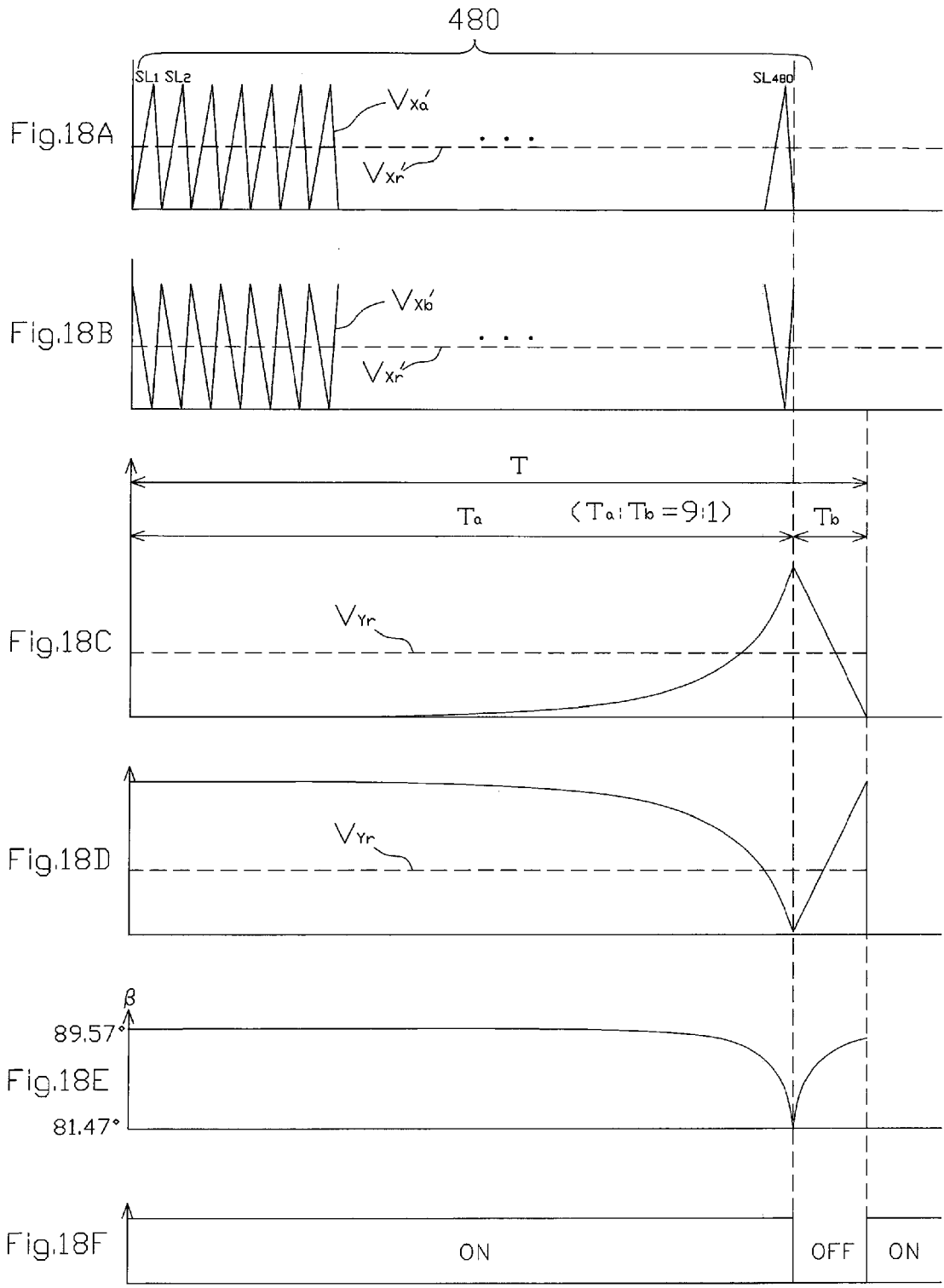

TWO-DIMENSIONAL OPTICAL DEFLECTOR APPARATUS USING CURVED-TYPE SAW-TOOTH DRIVE VOLTAGES

This application claims the priority benefit under 35 U.S.C. §119 to Japanese Patent Application No. JP2011-067534 filed on Mar. 25, 2011, which disclosure is hereby incorporated in its entirety by reference.

BACKGROUND

1. Field

The presently disclosed subject matter relates to an optical deflector apparatus which can be applied to a vehicle headlamp, for example.

2. Description of the Related Art

A prior art two-dimensional optical deflector is constructed by a mirror, a movable frame surrounding the mirror for supporting the mirror through a pair of torsion bars, inner piezoelectric actuators (first piezoelectric actuators) of a torsion-bar type fixed between the movable frame and the torsion bars and serving as cantilevers for rocking the mirror through the torsion bars with respect to an X-axis of the mirror, a support body surrounding the movable frame, and outer piezoelectric actuators (second piezoelectric actuators) of a meander type fixed between the support body and the movable frame and serving as cantilevers for rocking the mirror through the movable frame with respect to a Y-axis of the mirror perpendicular to the X-axis (see: JP2009-223165A).

Generally, the mirror is rocked with respect to the X-axis for a horizontal deflection at a high frequency by the inner piezoelectric actuators using sinusoidal waves, while the mirror is rocked with respect to the Y-axis for a vertical deflection at a low frequency by the outer piezoelectric actuators using straight-type saw-tooth waves.

When the above-described prior art two-dimensional optical deflector is applied to a vehicle headlamp for distributing light, since each of the saw-tooth waves are not symmetrical with respect to the center thereof, i.e., a rising period or a falling period of each of the saw-tooth waves is much longer than a falling period or a rising period thereof, a light source must be turned off to stop the horizontal deflection for the falling period of each of the saw-tooth waves, which would complicate the control. Also, since the saw-tooth waves are of a straight-type, irregularity of illumination would occur. This will be discussed later in detail.

SUMMARY

The presently disclosed subject matter seeks to solve one or more of the above-described problems.

According to the presently disclosed subject matter, in a two-dimensional optical deflector apparatus comprising an optical deflector and a driver for driving the optical deflector, the optical deflector includes a mirror, a first piezoelectric actuator for rocking the mirror with respect to a first axis of the mirror, and a second piezoelectric actuator of a meander type for rocking the mirror with respect to a second axis of the mirror perpendicular to the first axis. The driver generates a curved-type saw-tooth drive voltage and applies the curved-type saw-tooth drive voltage to the second piezoelectric actuator.

Since the saw-tooth drive voltage applied to the second piezoelectric actuator is of a curved-type, the rate of the downward angle (inclination cosine angle) of the mirror can be curved. As a result, when the two-dimensional optical deflector apparatus according to the presently disclosed subject matter is applied to a vehicle headlamp, the irregularity of illumination can be suppressed.

BRIEF DESCRIPTION OF THE DRAWINGS

The above and other advantages and features of the presently disclosed subject matter will be more apparent from the following description of certain embodiments, taken in conjunction with the accompanying drawings, as compared with the prior art, wherein:

FIG. 16 is a cross-sectional view of the optical deflector of FIG. 15;

FIGS. 17A, 17B, 17C, 17D, 17E and 17F are timing diagrams for explaining the operation of the optical deflector apparatus of FIG. 15; and FIGS. 18A, 18B, 18C, 18D, 18E and 18F are other timing diagrams for explaining the operation of the optical deflector apparatus of FIG. 15.

DETAILED DESCRIPTION OF EXEMPLARY EMBODIMENTS

Before the description of exemplary embodiments, a prior art two-dimensional optical deflector will be described with reference to FIGS. 1, 2, 3A through 3F, 4 and 5.

Figure 1:
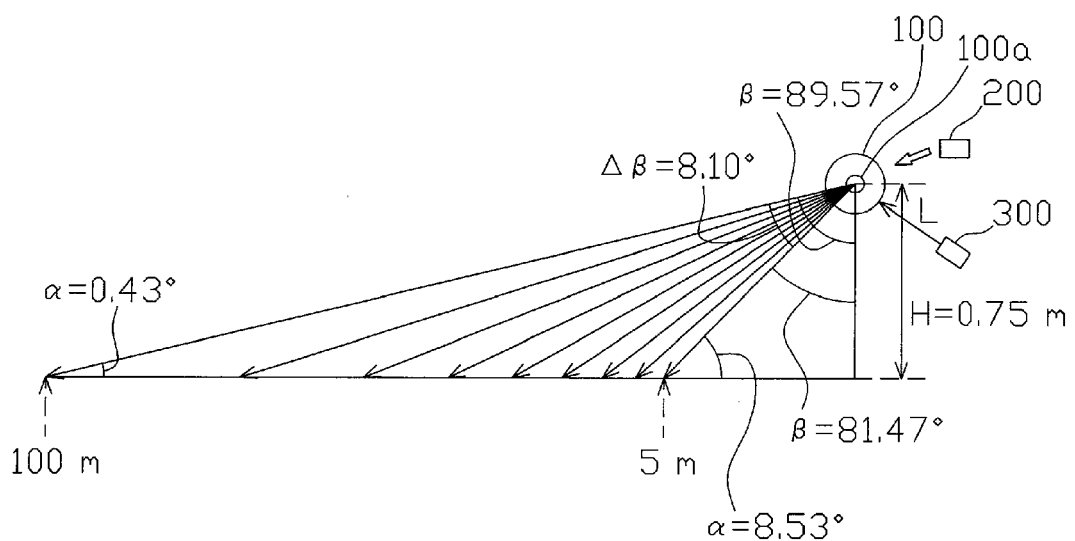
FIG. 1 is a diagram for explaining the rocking angle of a mirror of a vehicle headlamp with respect to the horizontal direction to which the prior art two-dimensional optical deflector is applied.

In FIG. 1, which is a diagram for explaining the rocking angle of a mirror of a vehicle headlamp with respect to the horizontal direction to which the prior art two-dimensional optical deflector 100 is applied, the optical deflector 100 associated with its driver 200 is located at a height H of 0.75 m and reflected light R of light L from a laser diode 300 by a mirror 100a reaches from 5 m to 100 m ahead of the optical deflector 100. Here, if a downward angle (inclination cosine angle) β is defined by β=0° for the vertical direction and β=90° for the horizontal direction, the distance of 5 m corresponds to β=81.47° and the distance of 100 m corresponds to β=89.57°, so that the deflected angle Δβ of the reflected light R is 8.10° (=89.57°-81.47°. In this case, the elevation angle α for the optical deflector 100 is 8.53° when β=81.47° and 0.43° when β=89.57°.

Figure 2:
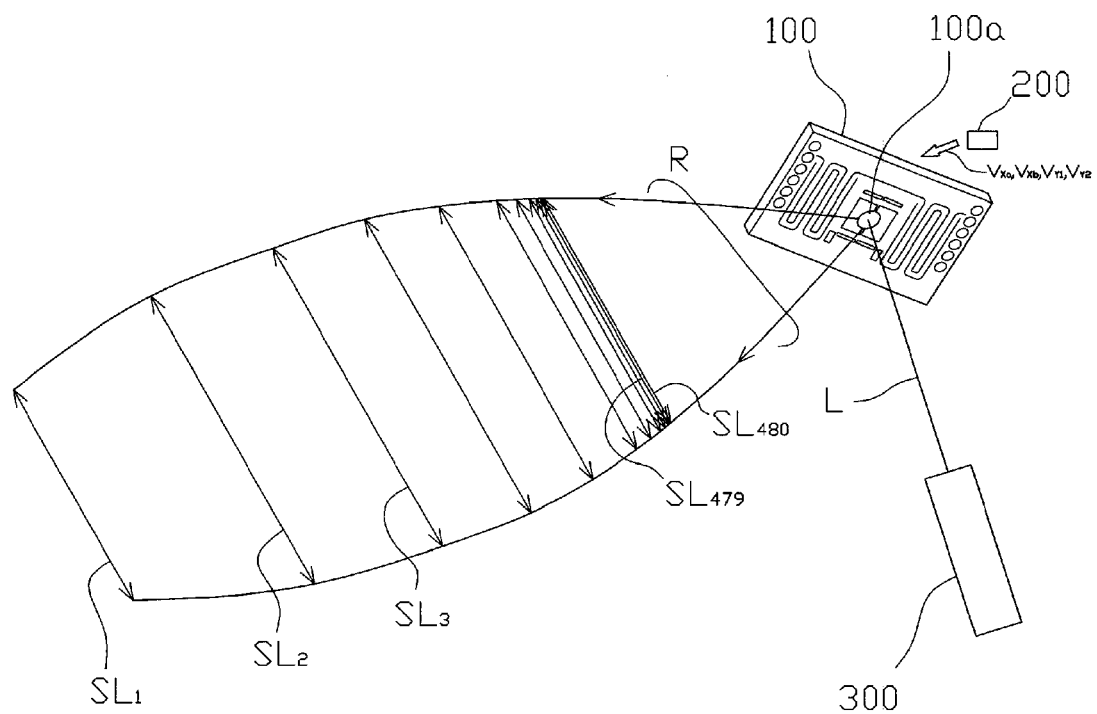
FIG. 2 is a diagram illustrating scan lines of the reflected light of FIG. 1.
Figure 3A:
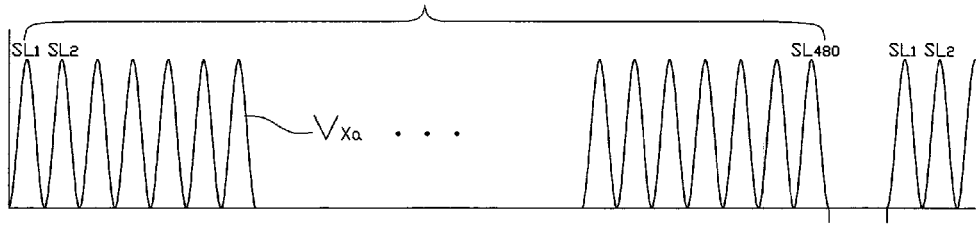
FIGS. 3A, 3B, 3C, 3D, 3E and 3F are timing diagrams for explaining the operation of the optical deflector of FIG. 1.
Figure 3B:
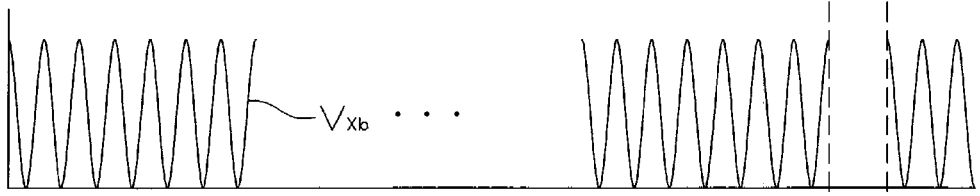
Figure 3C:
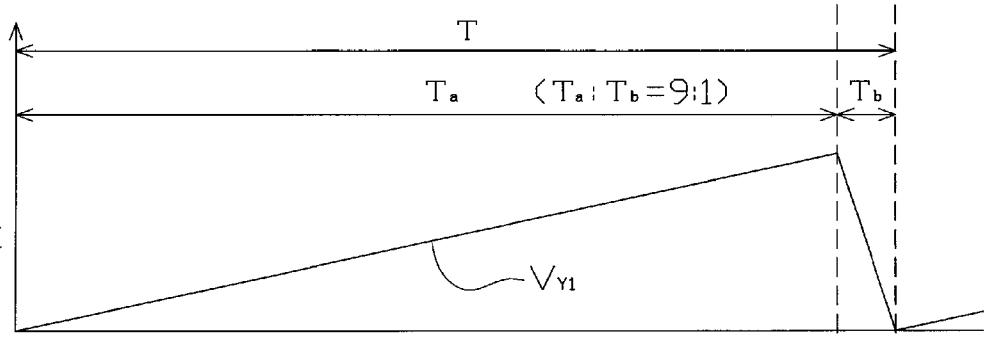
Figure 3D:
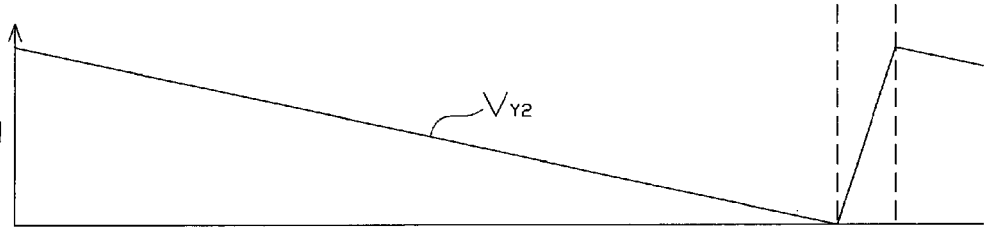

In FIG. 2, which illustrates scan lines of the reflected light R of FIG. 1, the reflected light R is obtained by reflecting the light L from the laser diode 300 at the mirror 100a which is rocked with respect to a first axis such as an X-axis by sinusoidal voltages $V_{Xa}$ and $V_{Xb}$ from the driver 200 opposite in phase to each other as shown in FIGS. 3A and 3B and is rocked with respect to a second axis such as an Y-axis perpendicular to the X-axis by straight-type saw-tooth voltages $V_{Y1}$ and $V_{Y2}$ from the driver 200 opposite in phase to each other as shown in FIGS. 3C and 3D. In this case, if the frequency of the sinusoidal voltages $V_{Xa}$ and $V_{Xb}$ is 480 times that of the straight-type saw-tooth voltages $V_{Y1}$ and $V_{Y2}$, the reflected light R has 480 scan lines $SL_1, SL_2, \ldots, SL_{480}$. The uppermost scan line $SL_1$ corresponds to the farthest distance 100 m at β=89.57°, and the lowermost scan line $SL_{430}$ corresponds to the nearest distance 5 m at β=81.47°. Note that each scan line is actually formed by a pair of right-direction and left-direction scan lines.

Figure 3E:
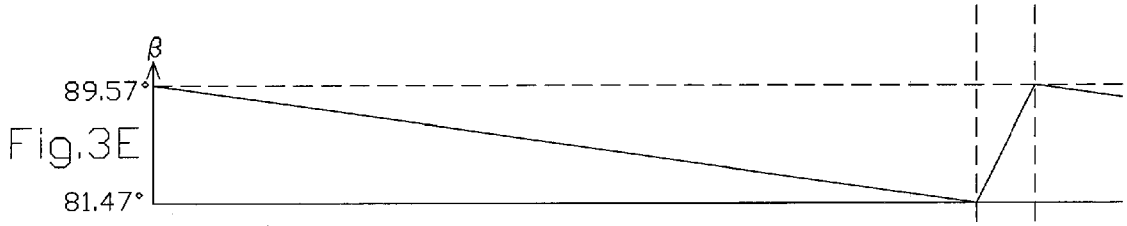
Figure 3F:
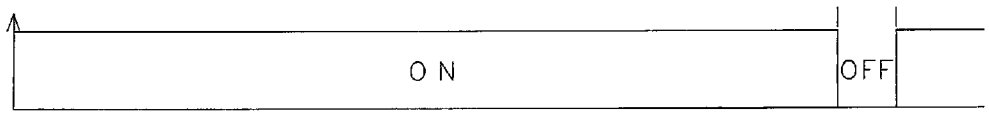

As illustrated in FIGS. 3C and 3D, a rising period $T_a$ of the straight-type saw-tooth voltage $V_{Y1}$ (a falling period $T_b$ of the straight-type saw-tooth voltage $V_{Y2}$) is much longer than a falling period $T_b$ of the straight-type saw-tooth voltage $V_{Y1}$ (a rising period $T_b$ of the straight-type saw-tooth voltage $V_{Y2}$). Here, $$T_a + T_b = T$$

where T is one period. In this case, for the period $T_a$, the straight-type saw-tooth voltage $V_{Y1}$ is linearly-increased at a definite rate while the straight-type saw-tooth voltage $V_{Y2}$ is linearly-decreased at the definite rate. Therefore, as illustrated in FIG. 3E, the downward angle β is linearly-decreased at a definite rate for the period $T_a$. In this case, the peak values of the straight-type saw-tooth voltages $V_{Y1}$ and $V_{Y2}$ are greatly shifted toward the end of their period T, i.e., $T_a \gg T_b$, so that the downward angle β is rapidly increased for the period $T_b$. Therefore, since it is difficult to carry out the horizontal deflection for the period $T_b$, the laser diode 300 is turned off to stop the horizontal scanning operation, as illustrated in FIG. 3F, which would complicate the control. On the other hand, the rocking rate of the mirror 100a is zero at dead points where β=89.57° and 8=81.47° and is uniform between the dead points. Therefore, the scan lines $SL_1, SL_2, \ldots, SL_{480}$ are uniformly present only for the period $T_a$.

Figure 4:
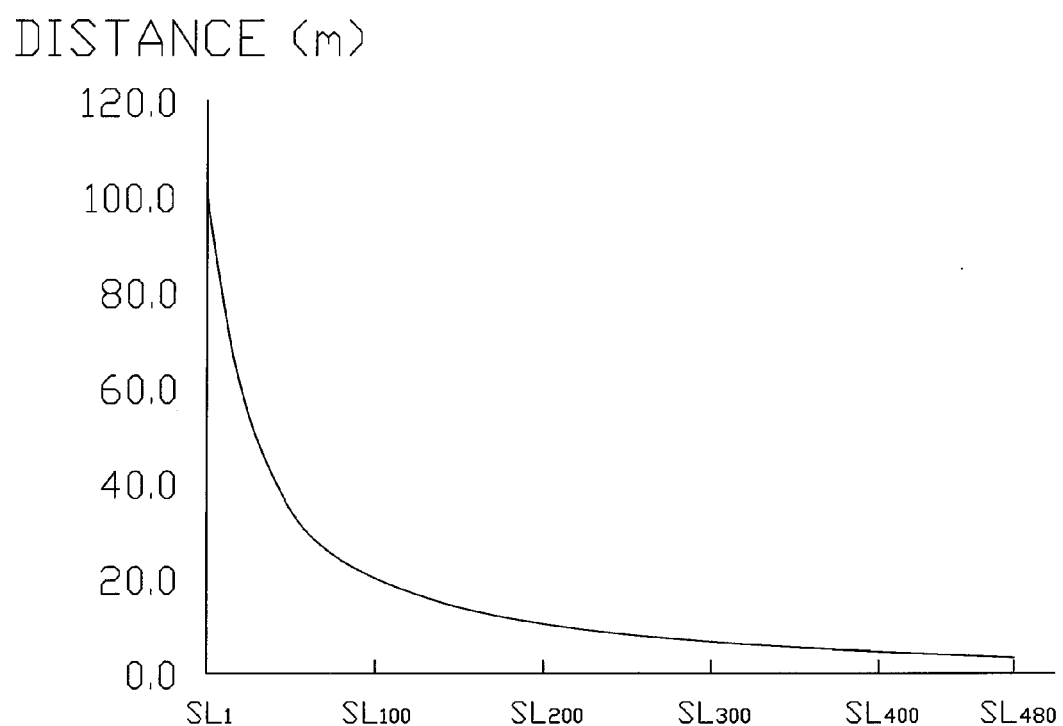
FIG. 4 is a diagram illustrating the relationship between the scan line and the distance of FIG. 2.
Figure 5:
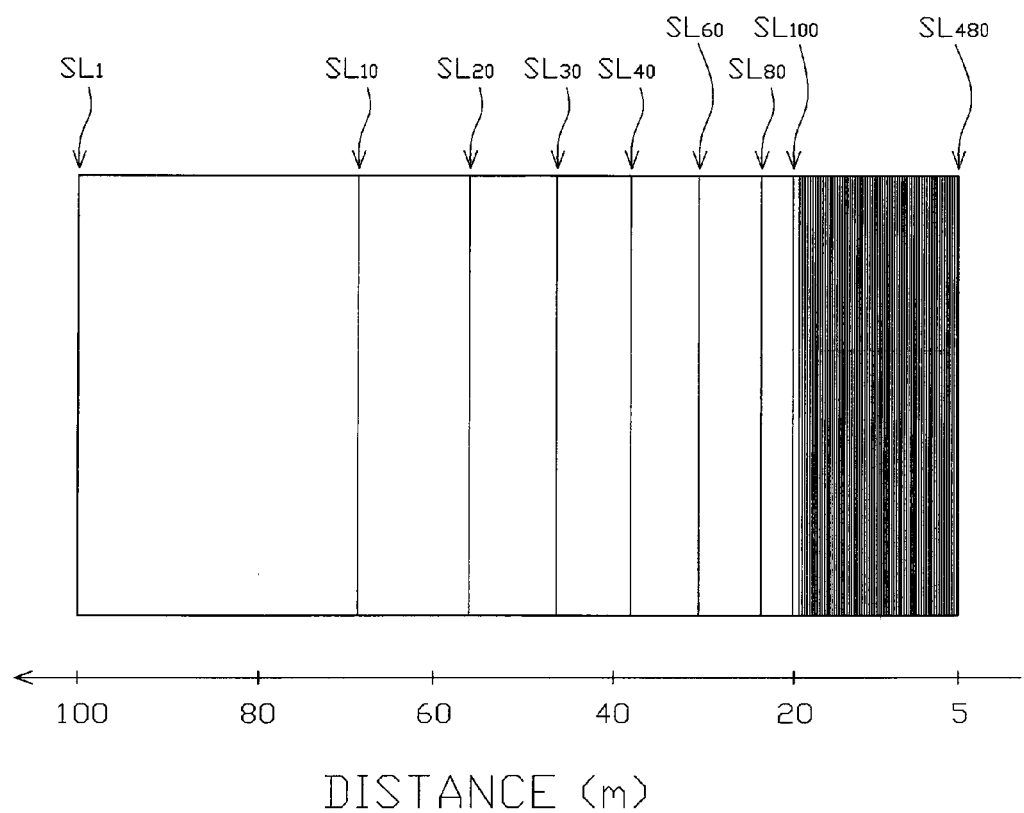
FIG. 5 is a diagram illustrating the density of scan lines of FIG. 2.

FIG. 4 is a diagram illustrating the relationship between the scan lines $SL_1$ and the distance of illumination by the scan line $SL_i$ (i=1, 2, . . . , 480) of FIG. 2, and FIG. 5 is a diagram illustrating the density of scan lines $SL_i$ in the horizontal direction of FIG. 2. As illustrated in FIGS. 4 and 5, since the scanning time period of each of the scan lines $SL_1, SL_2, \ldots, SL_{480}$ is definite, the larger the distance from the optical deflector 100, the smaller the density of scan lines in the horizontal direction. For example, the number of scan lines is 20 within the distance of 40 m to 100 m from the optical deflector 100, while the number of scan lines is 460 within the distance of 5 m to 40 m from the optical deflector 100. Therefore, each of the scan lines $SL_1, SL_2, \ldots, SL_{20}$ would be clearly observed as lines.

Thus, irregularity of illumination depending upon the distance from the optical deflector 100 would occur.

Figure 6:
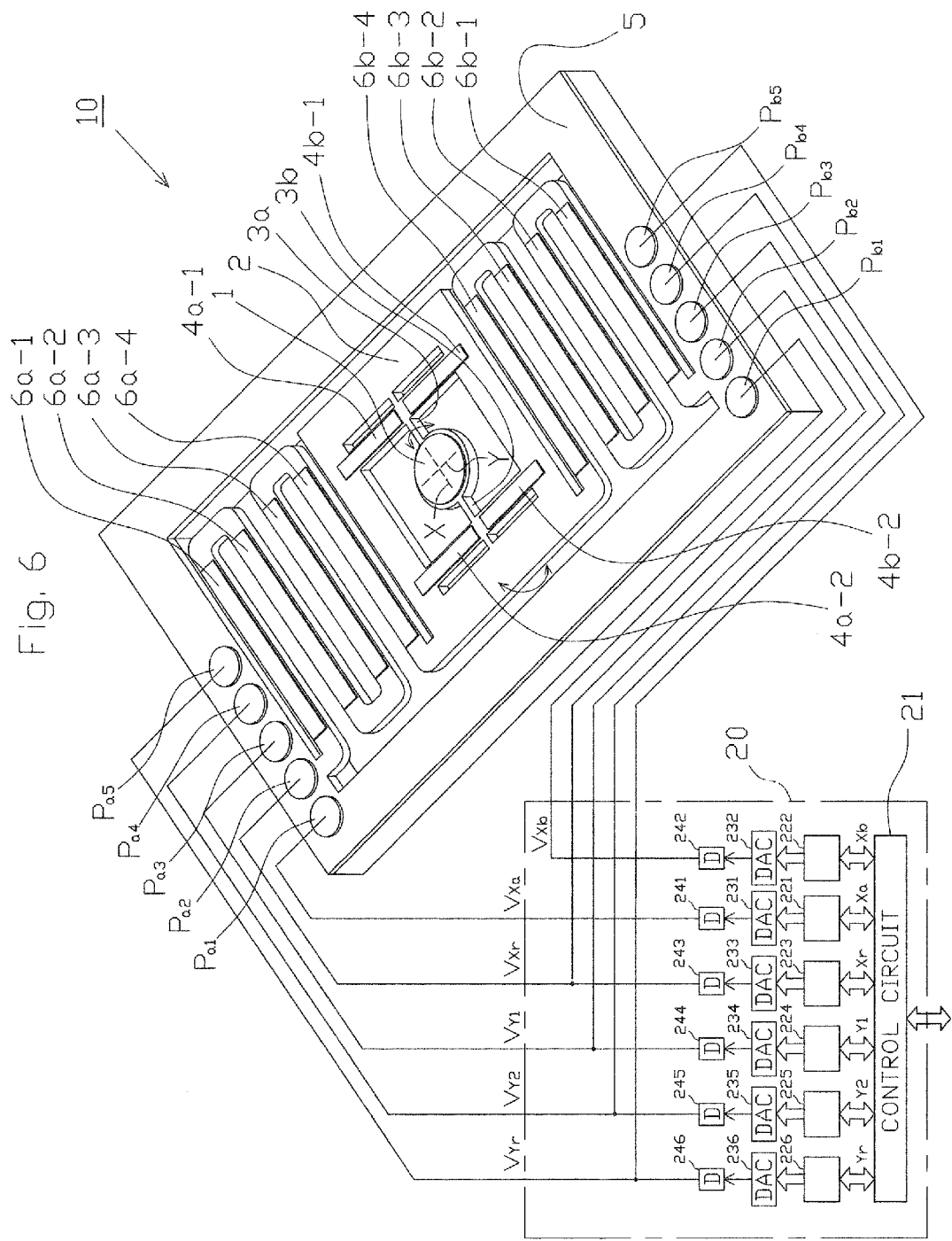
FIG. 6 is a diagram illustrating a first embodiment of the two-dimensional optical deflector apparatus according to the presently disclosed subject matter.

In FIG. 6, which illustrates a first embodiment of the optical deflector apparatus according to the presently disclosed subject matter, an optical deflector 10 and its driver 20 are provided.

The optical deflector 10 is constructed by a circular mirror 1 for reflecting an incident light, a movable frame 2 surrounding the mirror 1 for supporting the mirror 1 through a pair of torsion bars 3a and 3b, inner piezoelectric actuators (first piezoelectric actuators) 4a-1, 4a-2, 4b-1 and 4b-2 of a torsion-bar type fixed between the movable frame 2 and the torsion bars 3a and 3b and serving as cantilevers for rocking the mirror 1 through the torsion bars 3a and 3b with respect to an X-axis of the mirror 1, a support body 5 surrounding the movable frame 2, and outer piezoelectric actuators (second piezoelectric actuators) 6a-1, 6a-2, 6a-3 and 6a-4, 6b-1, 6b-2, 6b-3 and 6b-4 of a meander type fixed between the support body 5 and the movable frame 2 and serving as cantilevers for rocking the mirror 1 through the movable frame 2 with respect to a Y-axis of the mirror 1 perpendicular to the X-axis. Each of the piezoelectric actuators 4a-1, 4a-2, 4b-1 and 4b-2, 6a-1, 6a-2, 6a-3 and 6a-4, 6b-1, 6b-2, 6b-3 and 6b-4 is also called a piezoelectric actuator element.

The torsion bars 3a and 3b are arranged along the X-axis, and have ends coupled to the inner circumference of the movable frame 2 and other ends coupled to the outer circumference of the mirror 1. Therefore, the torsion bars 3a and 3b are twisted by the inner piezoelectric actuators 4a-1, 4a-2, 4b-1 and 4b-2 to rock the mirror 1 with respect to the X-axis.

The inner piezoelectric actuators 4a-1 and 4b-1 oppose each other along the Y-axis and sandwich the torsion bar 3a. The inner piezoelectric actuators 4a-1 and 4b-1 have ends coupled to the inner circumference of the movable frame 2 and other ends coupled to the torsion bar 2a. In this case, the flexing direction of the inner piezoelectric actuator 4a-1 is opposite to that of the inner piezoelectric actuator 4b-1.

Similarly, the inner piezoelectric actuators 4a-2 and 4b-2 oppose each other along the Y-axis and sandwich the torsion bar 3b. The inner piezoelectric actuators 4a-2 and 4b-2 have ends coupled to the inner circumference of the movable frame 2 and other ends coupled to the torsion bar 3b. In this case, the flexing direction of the inner piezoelectric actuator 4a-2 is opposite to that of the inner piezoelectric actuator 4b-2.

The support body 5 is rectangularly-framed to surround the movable frame 2.

The outer piezoelectric actuators 6a-1, 6a-2, 6a-3 and 6a-4, 6b-1, 6b-2, 6b-3 and 6b-4 are coupled between the inner circumference of the support body 5 and the outer circumference of the movable frame 2, in order to rock the movable frame 2 associated with the mirror 1 with respect to the support body 5, i.e., to rock the mirror 1 with respect to the Y-axis.

The outer piezoelectric actuators 6a-1, 6a-2, 6a-3 and 6a-4 are serially-coupled from the support body 5 to the movable frame 2. Also, each of the outer piezoelectric actuators 6a-1, 6a-2, 6a-3 and 6a-4 are in parallel with the X-axis of the mirror 1. Therefore, the outer piezoelectric actuators 6a-1, 6a-2, 6a-3 and 6a-4 are folded at every actuator or meandering from the support body 5 to the movable frame 2, so that the amplitudes of the outer piezoelectric actuators 6a-1, 6a-2, 6a-3 and 6a-4 can be changed along directions perpendicular to the Y-axis of the mirror 1.

Similarly, the outer piezoelectric actuators 6b-1, 6b-2, 6b-3 and 6b-4 are serially-coupled from the support body 5 to the movable frame 2. Also, each of the outer piezoelectric actuators 6b-1, 6b-2, 6b-3 and 6b-4 are in parallel with the X-axis of the mirror 1. Therefore, the outer piezoelectric actuators 6b-1, 6b-2, 6b-3 and 6b-4 are folded at every actuator or meandering from the support body 5 to the movable frame 2, so that the amplitudes of the outer piezoelectric actuators 6b-1, 6b-2, 6b-3 and 6b-4 can be changed along directions perpendicular to the Y-axis of the mirror 1.

Provided on the optical deflector 10 are pads $P_{a1}$, $P_{a2}$, $P_{a3}$, $P_{a4}$ and $P_{a5}$, $P_{b1}$, $P_{b2}$, $P_{b3}$, $P_{b4}$ and $P_{b5}$ which are connected to the driver 20.

Figure 7:
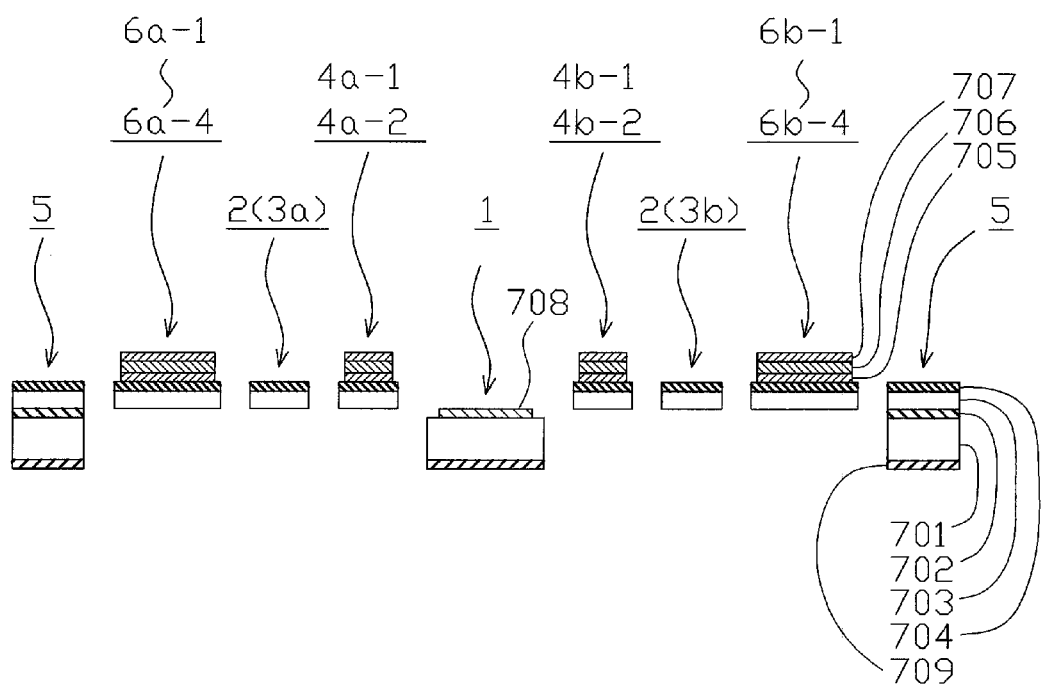
FIG. 7 is a cross-sectional view of the optical deflector of FIG. 6.

The pad $P_{a1}$ is connected to the upper electrode layer 707 (see: FIG. 7) of each of the inner piezoelectric actuators 4a-1 and 4a-2, and the pad $P_{a2}$ is connected to the lower electrode layer 705 (see: FIG. 7) of each of the inner piezoelectric actuators 4a-1 and 4a-2. Also, the pad $P_{a3}$ is connected to the upper electrode layer 707 (see: FIG. 7) of each of the outer piezoelectric actuators 6a-1 and 6a-3, and the pad $P_{a4}$ is connected to the upper electrode layer 707 (see: FIG. 7) of each of the outer piezoelectric actuators 6a-2 and 6a-4. Further, the pad $P_{a5}$ is connected to the lower electrode layer 705 (see: FIG. 7) of each of the outer piezoelectric actuators 6a-1, 6a-2, 6a-3 and 6a-4.

On the other hand, the pad $P_{b1}$ is connected to the upper electrode layer 707 (see: FIG. 7) of each of the inner piezoelectric actuators 4b-1 and 4b-2, and the pad $P_{b2}$ is connected to the lower electrode layer 705 (see: FIG. 7) of each of the inner piezoelectric actuators 4b-1 and 4b-2. Also, the pad $P_{b3}$ is connected to the upper electrode layer 707 (see: FIG. 7) of each of the outer piezoelectric actuators 6b-1 and 6b-3, and the pad $P_{b4}$ is connected to the upper electrode layer 707 (see: FIG. 7) of each of the outer piezoelectric actuators 6b-2 and 6b-4. Further, the pad $P_{b5}$ is connected to the lower electrode layer 705 (see: FIG. 7) of each of the outer piezoelectric actuators 6b-1, 6b-2, 6b-3 and 6b-4.

The driver 20 is constructed by a control circuit 21 such as a microcomputer including a central processing unit (CPU), a read-only memory (ROM), a random access memory (RAM), an input/output (I/O) interface and the like.

The driver 20 further includes a nonvolatile memory 221 for storing drive data Xa for driving the upper electrode layers of the inner piezoelectric actuators 4a-1 and 4a-2, a digital-to-analog converter (DAC) 231 for converting the drive data Xa into a sinusoidal-wave drive voltage $V_{Xa}$, and a drive circuit 241 for applying the sinusoidal-wave drive voltage $V_{Xa}$ to the pad $P_{a1}$.

The driver 20 further includes a nonvolatile memory 222 for storing drive data Xb for driving the upper electrode layers of the inner piezoelectric actuators 4b-1 and 4b-2, a digital-to-analog converter (DAC) 232 for converting the drive data Xb into a sinusoidal-wave drive voltage $V_{Xb}$, and a drive circuit 242 for applying the sinusoidal-wave drive voltage $V_{Xb}$ to the pad $P_{b1}$.

The driver 20 further includes a nonvolatile memory 223 for storing reference data Xr for driving the lower electrode layers of the inner piezoelectric actuators 4a-1, 4a-2, 4b-1 and 4b-2, a digital-to-analog converter (DAC) 233 for converting the reference data Xr into a reference voltage $V_{Xr}$, and a drive circuit 243 for applying the reference voltage $V_{Xr}$ to the pads $P_{a2}$ and $P_{b2}$.

The driver 20 further includes a nonvolatile memory 224 for storing drive data Y1 for driving the upper electrode layers of the outer piezoelectric actuators 6a-1, 6a-3, 6b-1 and 6b-3, a digital-to-analog converter (DAC) 234 for converting the drive data Y1 into a curved-type saw-tooth drive voltage $V_{Y1}$, and a drive circuit 244 for applying the curved-type saw-tooth drive voltage $V_{Y1}$ to the pads $P_{a3}$ and $P_{b3}$.

The driver 20 further includes a nonvolatile memory 225 for storing drive data Y2 for driving the upper electrode layers of the outer piezoelectric actuators 6a-2, 6a-4, 6b-2 and 6b-4, a digital-to-analog converter (DAC) 235 for converting the drive data Y2 into a curved-type saw-tooth drive voltage $V_{Y2}$, and a drive circuit 245 for applying the curved-type saw-tooth drive voltage $V_{Y2}$ to the pads $P_{a4}$ and $P_{b4}$.

The driver 20 further includes a nonvolatile memory 226 for storing reference data Yr for driving the lower electrode layers of the outer piezoelectric actuators 6a-1, 6a-2, 6a-3, 6a-4, 6b-1, 6b-2, 6b-3 and 6b-4, a digital-to-analog converter (DAC) 236 for converting the reference data Yr into a reference voltage $V_{Yr}$, and a drive circuit 246 for applying the reference voltage $V_{Yr}$ to the pads $P_{a5}$ and $P_{b5}$.

Note that the number of the outer piezoelectric actuators 6a-1, 6a-2, 6a-3 and 6a-4 and the number of the outer piezoelectric actuators 6b-1, 6b-2, 6b-3 and 6b-4 can be other values such as 2, 6, 8, . . . .

The structure of each element of the optical deflector 10 is explained next with reference to FIG. 7.

In FIG. 7, a monocrystalline silicon support layer 701, an intermediate silicon oxide layer 702 and a monocrystalline silicon active layer 703 are formed by a silicon-on-insulator (SOI) substrate. Also, reference numeral 704 designates a silicon oxide layer, 705 designates a lower electrode layer made of Pt, Au or the like, 706 designates a lead titanate zirconate (PZT) layer, 707 designates an upper electrode layer made of Pt, Au or the like, 708 designates a metal layer made of Al, Ag or the like, and 709 designates a hard mask layer made of silicon oxide or the like.

The mirror 1 is constructed by the monocrystalline silicon support layer 701 serving as a vibration plate, the metal layer 708 serving as a reflector and the hard mask layer 709.

The movable frame 2 and the torsion bars 3a and 3b are constructed by the monocrystalline silicon active layer 703 and the silicon oxide layer 704.

The inner piezoelectric actuators 4a-1, 4a-2, 4b-1 and 4b-2 and the outer piezoelectric actuators 6a-1 to 6a-4 and 6b-1 to 6b-4 are constructed by the monocrystalline silicon active layer 703, the silicon oxide layer 704, the lower electrode layer 705, the PZT layer 706 and the upper electrode layer 707.

The support body 5 is constructed by the monocrystalline silicon layer 701, the intermediate silicon layer 702, the monocrystalline silicon active layer 703, the silicon oxide layer 704 and the hard mask layer 709.

The pads $P_{a1}$, $P_{a2}$, $P_{a3}$, $P_{a4}$ and $P_{a5}$, $P_{b1}$, $P_{b2}$, $P_{b3}$, $P_{b4}$ and $P_{b5}$ are constructed by the lower electrode layer 705.

First, an optical deflection or horizontal scanning operation by rocking the mirror 1 with respect to the X-axis is explained below.

Figure 8:
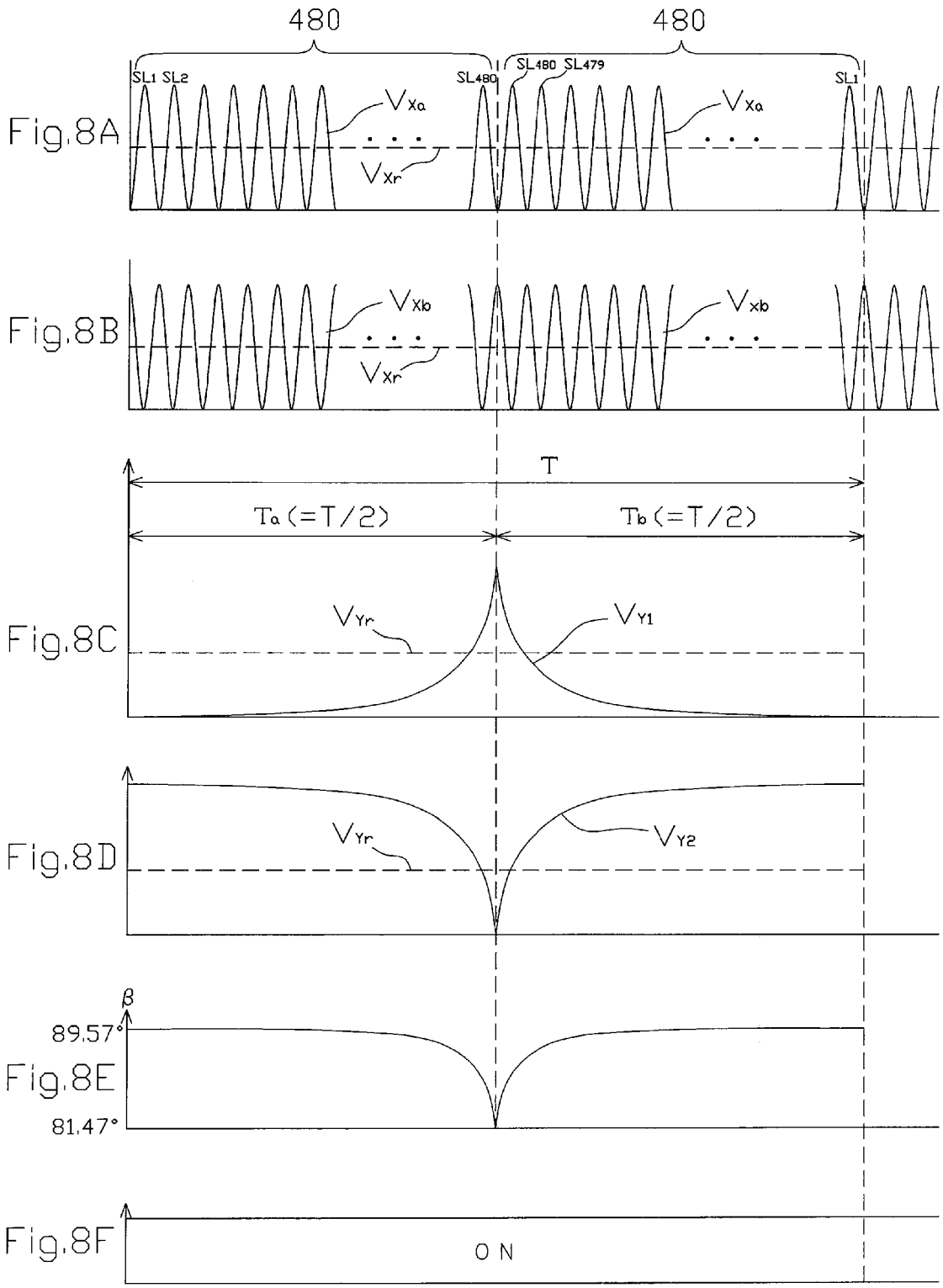
FIGS. 8A, 8B, 8C, 8D, 8E and 8F are timing diagrams for explaining the operation of the optical deflector apparatus of FIG. 6.

That is, as illustrated in FIGS. 8A and 8B, in the same way as in the prior art, the sinusoidal-wave drive voltage $V_{Xa}$ based upon the drive data Xa stored in advance in the nonvolatile memory 221 and the sinusoidal-wave drive voltage $V_{Xb}$ based upon the drive data Xb stored in advance in the nonvolatile memory 222 are sinusoidal at a predetermined frequency and symmetrical or opposite in phase to each other with the reference voltage $V_{Xr}$ based upon the reference data Xr stored in advance in the nonvolatile memory 223. As a result, the inner piezoelectric actuators 4a-1 and 4a-2 and the inner piezoelectric actuators 4b-1 and 4b-2 carry out flexing operations in opposite directions to each other, so that the torsion bars 3a and 3b are twisted to rock the mirror 1 with respect to the X-axis.

In the optical deflection or horizontal scanning operation by rocking the mirror 1 with respect to the X-axis, if the frequency of the sinusoidal-wave drive voltages $V_{Xa}$ and $V_{Xb}$ resonates with the natural frequency of a mechanically-vibrating system of the mirror 1 with respect to the X-axis depending upon the inner piezoelectric actuators 4a-1, 4a-2, 4b-1 and 4b-2, the deflection angle of the mirror 1 can be increased.

Next, an optical deflection or vertical scanning operation by rocking the mirror 1 with respect to the Y-axis is explained below.

The outer piezoelectric actuators 6a-1, 6a-2, 6a-3, 6a-4, 6b-1, 6b-2, 6b-3 and 6b-4 are divided into an odd-numbered group of the outer piezoelectric actuators 6a-1 and 6a-3; 6b-1 and 6b-3, and an even-numbered group of the outer piezoelectric actuators 6a-2 and 6a-4; 6b-2 and 6b-4 alternating with the odd-numbered group of the outer piezoelectric actuators 6a-1 and 6a-3; 6b-1 and 6b-3.

Figure 9:
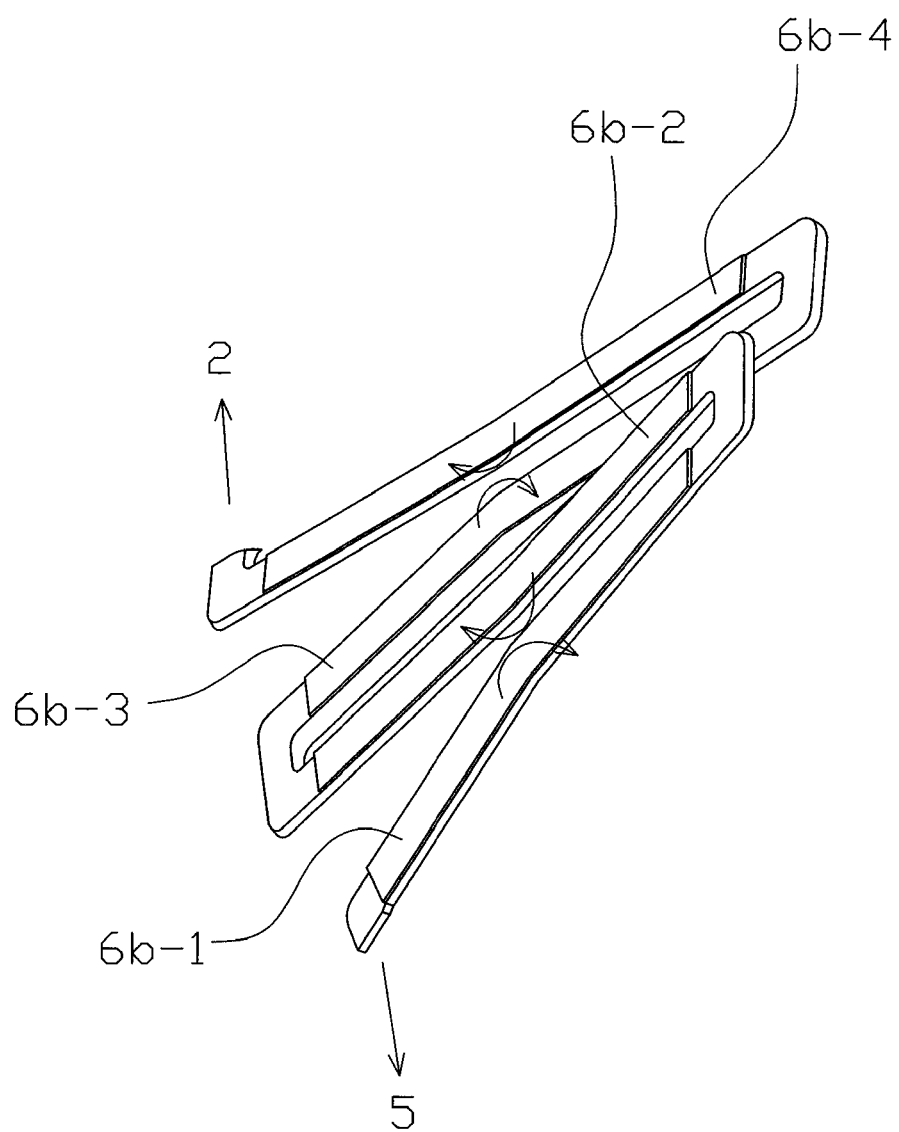
FIG. 9 is a diagram for explaining the operation of the outer piezoelectric actuators of FIG. 6.

As illustrated in FIG. 9 which illustrates only the outer piezoelectric actuators 6b-1, 6b-2, 6b-3 and 6b-4, when the odd-numbered group of the outer piezoelectric actuators 6a-1, 6a-3, 6b-1 and 6b-3 are flexed in one direction, for example, in a downward direction, the even-numbered group of the outer piezoelectric actuators 6a-2, 6a-4, 6b-2 and 6b-4 are flexed in the other direction, i.e., in an upward direction. On the other hand, when the odd-numbered group of the outer piezoelectric actuators 6a-1, 6a-3, 6b-1 and 6b-3 are flexed in the upward direction, the even-numbered group of the outer piezoelectric actuators 6a-2, 6a-4, 6b-2 and 6b-4 are flexed in the downward direction. Thus, the mirror 1 is rocked with respect to the Y-axis.

Note that the frequency of the curved-type saw-tooth drive voltages $V_{Y1}$ and $V_{Y2}$ is sufficiently small in order not to resonate with the natural frequency of a mechanically-vibrating system of the mirror 1 with respect to the Y-axis depending upon the outer piezoelectric actuators 6a-1, 6a-2, 6a-3 and 6a-4, 6b-1, 6b-2, 6b-3 and 6b-4.

That is, as illustrated in FIGS. 8C and 8D, the curved-type saw-tooth drive voltage $V_{Y1}$ based upon the drive data Y1 stored in advance in the nonvolatile memory 224 and the curved-type saw-tooth drive voltage $V_{Y2}$ based upon the drive data Y2 stored in advance in the nonvolatile memory 225 are curved-type saw-tooth-shaped at a predetermined frequency and symmetrical or opposite in phase to each other with the reference voltage $V_{Yr}$ based upon the drive data Yr stored in advance in the nonvolatile memory 226. The curved-type saw-tooth drive voltage $V_{Y1}$ as illustrated in FIG. 8C is applied to the odd-numbered group of the outer piezoelectric actuators 6a-1, 6a-3, 6b-1 and 6b-3, and the curved-type saw-tooth drive voltage $V_{Y2}$ as illustrated in FIG. 8D is applied to the even-numbered group of the outer piezoelectric actuators 6a-2, 6a-4, 6b-2 and 6b-4.

For each of the half periods $T_a$ and $T_b$ (=T/2), the curved-type saw-tooth drive voltages $V_{Y1}$ and $V_{Y2}$ are of a curved-type, i.e., the curved-type saw-tooth drive voltages $V_{Y1}$ and $V_{Y2}$ are first gradually changed and then, rapidly changed, or the curved-type saw-tooth drive voltages $V_{Y1}$ and $V_{Y2}$ are first rapidly changed and then, gradually changed. That is, for the former half period $T_a$, the curved-type saw-tooth drive voltage $V_{Y1}$ is first gradually increased and then, rapidly increased, and the curved-type saw-tooth drive voltage $V_{Y2}$ is first gradually decreased and then, rapidly decreased. On the other hand, for the latter half period $T_b$, the curved-type saw-tooth drive voltage $V_{Y1}$ is first rapidly decreased and then, gradually decreased, and the curved-type saw-tooth drive voltage $V_{Y2}$ is first rapidly increased and then, gradually increased. As a result, as illustrated in FIG. 8E, the rate of the downward angle β is curved, i.e., the downward angle β is first gradually changed and then, rapidly changed, or the downward angle β is first rapidly changed and then, gradually changed. That is, for the former half period $T_a$, the downward angle β is first gradually decreased from β=89.57° and then, rapidly decreased to β=81.47°. On the other hand, for the latter half period $T_b$, the downward angle β is first rapidly increased from β=81.47° and then, gradually increased to β=89.57°.

Figure 10:
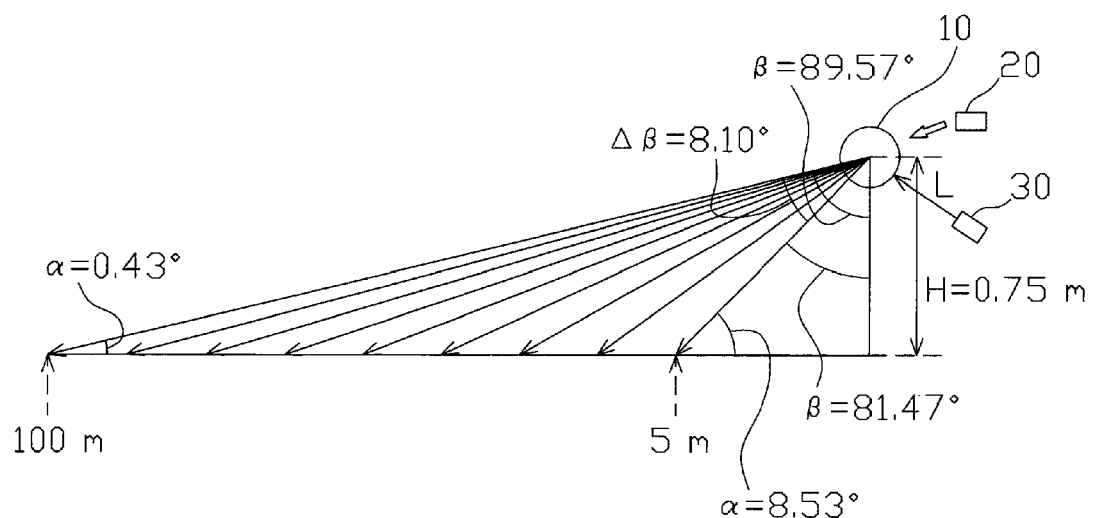
FIG. 10 is a diagram for explaining the rocking angle of the mirror of a vehicle headlamp with respect to the horizontal direction to which the two-dimensional optical deflector apparatus of FIG. 6 is applied.
Figure 11:
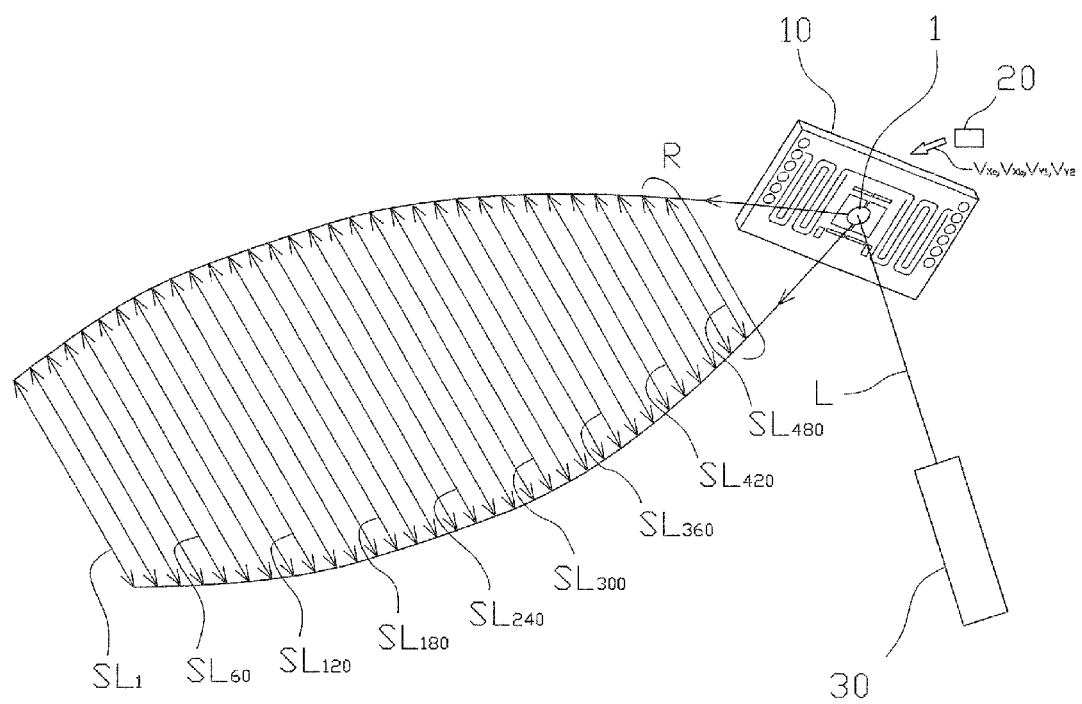
FIG. 11 is a diagram illustrating scan lines of the reflected light of FIG. 10.

The increasing and decreasing rates of the curved-type saw-tooth drive voltages $V_{Y1}$ and $V_{Y2}$, i.e., the decreasing and increasing rates of the downward angle β are determined, in such a way that the scan lines $SL_1, SL_2, \ldots, SL_{480}$ are uniform in the horizontal direction as illustrated in FIGS. 10 and 11. In more detail, in order to obtain regularity of illumination depending upon the distance from the optical deflector 10, the scan lines $SL_1, SL_2, \ldots, SL_{480}$ are uniformly ascended in the horizontal direction for the former half period $T_a$ (=T/2), while the scan lines $SL_{480}, SL_{479}, \ldots, SL_1$ are uniformly descended in the horizontal direction for the latter half period $T_b$.

In the prior art, note that, in order to maintain regularity of illumination depending upon the distance from the optical deflector, the periods of the scan lines $SL_1, SL_2, \ldots, SL_{480}$ need to be different from each other, which would complicate the control.

Also, since the scan lines $SL_1, SL_2, \ldots, SL_{480}$; $SL_{480}, \ldots, SL_{479}, \ldots, SL_1$ are uniformly present in the horizontal direction for the entire period T, the laser diode 30 needs not to be turned off, so that the horizontal scanning operation is not stopped. This would simplify the control.

Figure 12:
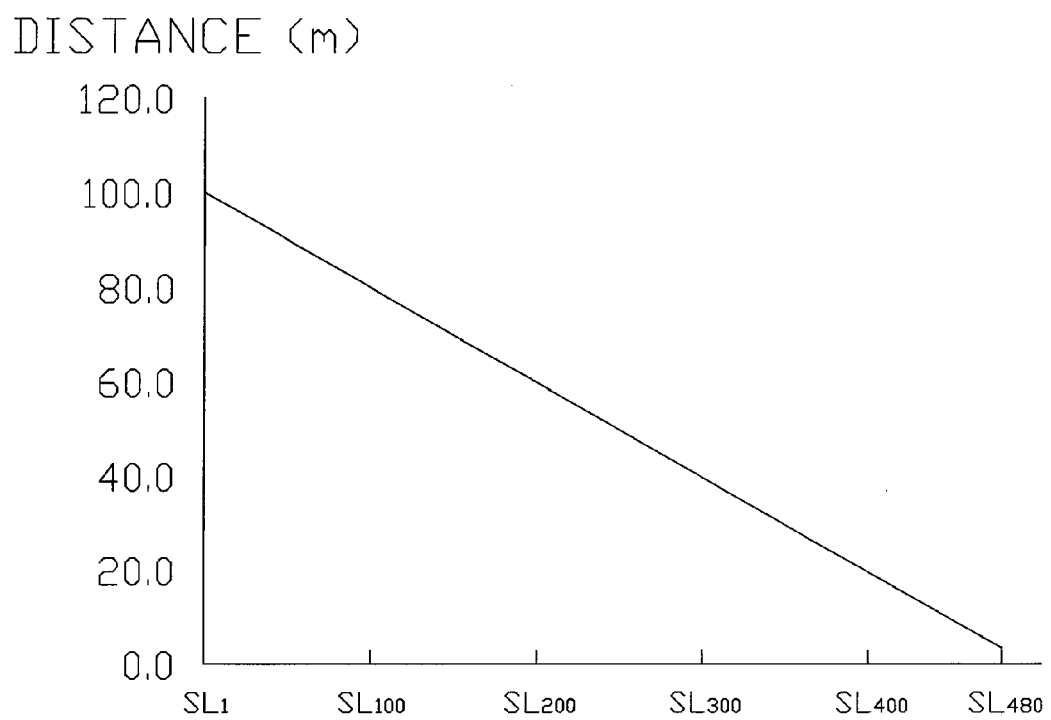
FIG. 12 is a diagram illustrating the relationship between the scan line and the distance of FIG. 11.
Figure 13:
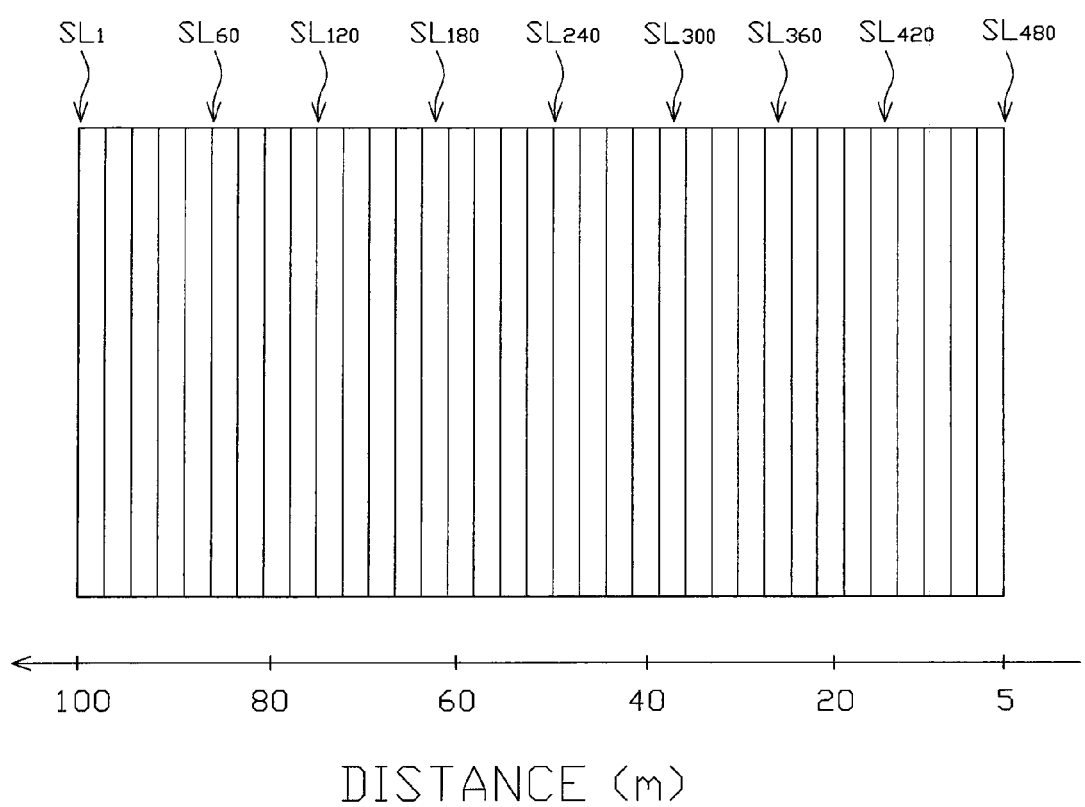
FIG. 13 is a diagram illustrating the density of scan lines of FIG. 11.

FIG. 12 is a diagram illustrating the relationship between the scan lines $SL_1$ and the distance of illumination by the scan line $SL_i$ (i=1, 2, . . . , 480) of FIG. 11, and FIG. 13 is a diagram illustrating the density of scan lines $SL_i$ in the horizontal direction of FIG. 11. As illustrated in FIGS. 12 and 13, in spite of the distance from the optical deflector 10, the density of scan lines is definite in the horizontal direction.

Thus, irregularity of illumination depending upon the distance from the optical deflector 10 would not occur.

In the above-described example, although the frequency of the sinusoidal-wave drive voltages $V_{Xa}$ and $V_{Xb}$ is 960 times that of the curved-type drive voltages $V_{Y1}$ and $V_{Y2}$, a ratio of the frequency of the sinusoidal-wave drive voltages $V_{Xa}$ and $V_{Xb}$ to that of the curved-type drive voltages $V_{Y1}$ and $V_{Y2}$ may be larger than 1. Also, the frequency of the sinusoidal-wave drive voltages $V_{Xa}$ and $V_{Xb}$ for the former half period Ta may be different from the frequency of the sinusoidal-wave drive voltages $V_{Xa}$ and $V_{Xb}$ for the latter half period Tb.

In the above-described example, the former half period Ta is the same as the latter half period Tb, however, the former half period Ta may be longer than the latter half period Tb, for example, Ta:Tb=9:1, as illustrated in FIGS. 14A through 14F. In this case, the scan lines $SL_1, SL_2, \ldots, SL_{480}$ are uniformly ascended in the horizontal direction for the former half period Ta, and the laser diode 30 is turned off for the latter half period Tb to stop the horizontal scanning operation, which would complicate the control a little.

Figure 15:
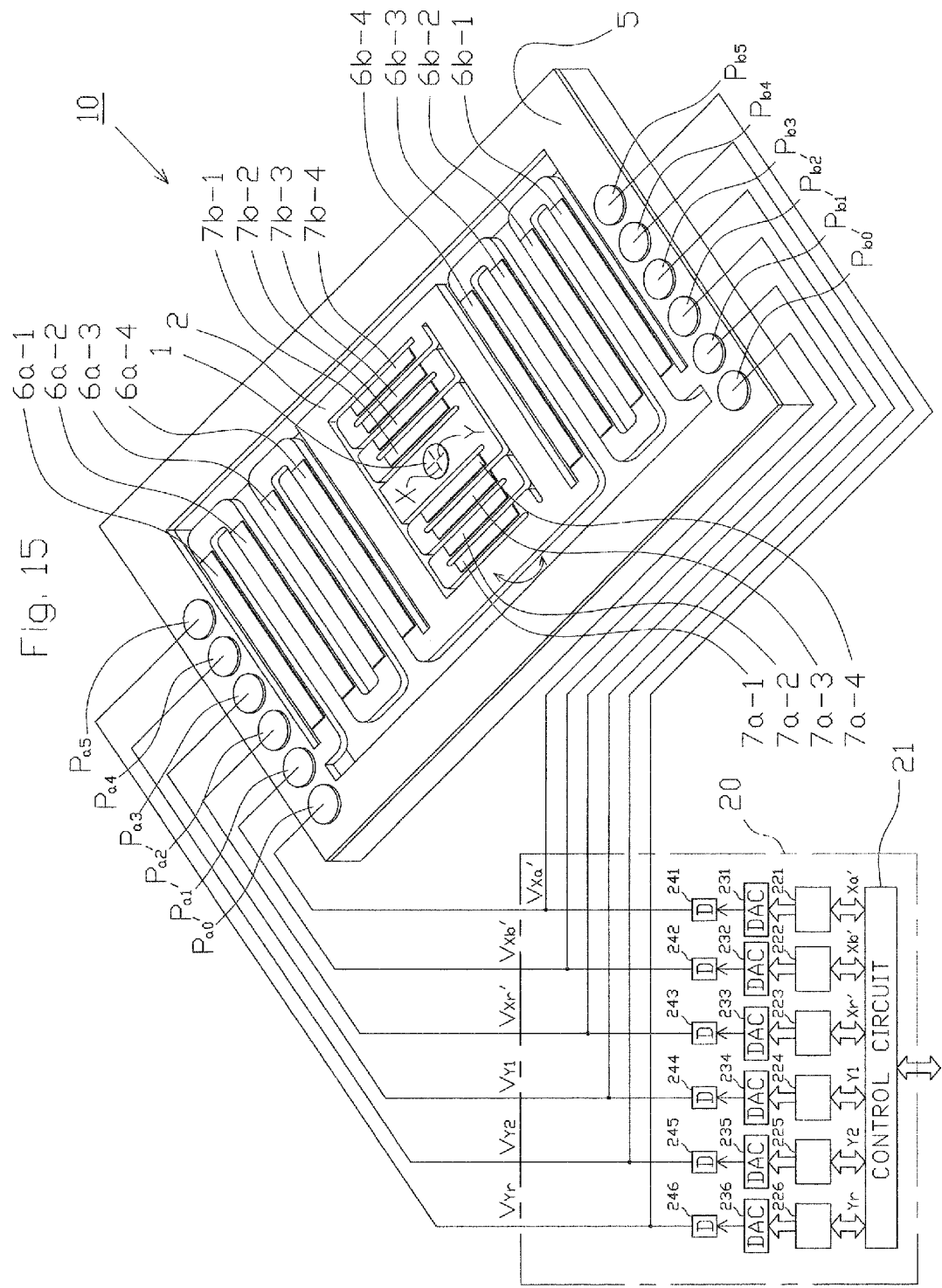
FIG. 15 is a diagram illustrating a second embodiment of the optical deflector apparatus according to the presently disclosed subject matter.

In FIG. 15, which illustrates a second embodiment of the optical deflector apparatus according to the presently disclosed subject matter, inner piezoelectric actuators (first piezoelectric actuators) 7a-1, 7a-2, 7a-3 and 7a-4, 7b-1, 7b-2, 7b-3 and 7b-4 of a meander type are provided instead of the torsion bars 3a and 3b and the inner piezoelectric actuators (first piezoelectric actuators) 4a-1, 4a-2, 4b-1 and 4b-2 of FIG. 6. Each of the piezoelectric actuators 7a-1, 7a-2, 7a-3 and 7a-4, 7b-1, 7b-2, 7b-3 and 7b-4 is called a piezoelectric actuator element.

The inner piezoelectric actuators 7a-1, 7a-2, 7a-3 and 7a-4, 7b-1, 7b-2, 7b-3 and 7b-4 are coupled between the inner circumference of the movable frame 2 and the mirror 1, in order to rock the mirror 1 with respect to the X-axis.

The inner piezoelectric actuators 7a-1, 7a-2, 7a-3 and 7a-4 are serially-coupled from the movable frame 2 to the mirror 1. Also, each of the inner piezoelectric actuators 7a-1, 7a-2, 7a-3 and 7a-4 are in parallel with the Y-axis of the mirror 1. Therefore, the inner piezoelectric actuators 7a-1, 7a-2, 7a-3 and 7a-4 are folded at every actuator or meandering from the support body 5 to the mirror 1, so that the amplitudes of the inner piezoelectric actuators 7a-1, 7a-2, 7a-3 and 7a-4 can be changed along directions perpendicular to the X-axis of the mirror 1.

Similarly, the inner piezoelectric actuators 7b-1, 7b-2, 7b-3 and 7b-4 are serially-coupled from the movable frame 2 to the mirror 1. Also, each of the inner piezoelectric actuators 7b-1, 7b-2, 7b-3 and 7b-4 are in parallel with the Y-axis of the mirror 1. Therefore, the inner piezoelectric actuators 7b-1, 7b-2, 7b-3 and 7b-4 are folded at every actuator or meandering from the support body 5 to the mirror 1, so that the amplitudes of the inner piezoelectric actuators 7b-1, 7b-2, 7b-3 and 7b-4 can be changed along directions perpendicular to the X-axis of the mirror 1.

Also, in FIG. 15, pads $P_{a0}'$, $P_{a1}'$, $P_{a2}'$, $P_{b0}'$, $P_{b1}'$ and $P_{b2}'$ are provided instead of the pads $P_{a1}$, $P_{a2}$ and $P_{b1}$, $P_{b2}$ of FIG. 6.

The pad $P_{a0}'$ is connected to the upper electrode layer 707 (see: FIG. 16) of each of the inner piezoelectric actuators 7a-1 and 7a-3, and the pad $P_{a1}'$ is connected to the upper electrode layer 707 (see: FIG. 16) of each of the inner piezoelectric actuators 7a-2 and 7a-4. Further, the pad $P_{a2}'$ is connected to the lower electrode layer 705 (see: FIG. 16) of each of the inner piezoelectric actuators 7a-1, 7a-2, 7a-3 and 7a-4.

On the other hand, the pad $P_{b0}'$ is connected to the upper electrode layer 707 (see: FIG. 16) of each of the inner piezoelectric actuators 7b-1 and 7b-3, and the pad $P_{b1}'$ is connected to the upper electrode layer 707 (see: FIG. 16) of each of the inner piezoelectric actuators 7b-2 and 7b-4. Further, the pad $P_{b2}'$ is connected to the lower electrode layer 705 (see: FIG. 16) of each of the inner piezoelectric actuators 7b-1, 7b-2, 7b-3 and 7b-4.

The drive circuit 241 applies a straight-type saw-tooth drive voltage $V_{Xa}'$ to the pads $P_{a0}'$ and $P_{b0}'$. Also, the drive circuit 242 applies a straight-type saw-tooth drive voltage $V_{Xb}'$ to the pads $P_{a1}'$ and $P_{b1}'$. Further, the drive circuit 243 applies a reference voltage $V_{Xr}'$ based upon reference data Xr' stored in the nonvolatile memory 223 to the pads $P_{a2}'$ and $P_{b2}'$.

Note that the frequency of the straight-type saw-tooth drive voltages $V_{Xa}'$ and $V_{Xb}'$ is sufficiently small in order not to resonate with the natural frequency of a mechanically-vibrating system of the mirror 1 with respect to the X-axis depending upon the inner piezoelectric actuators 7a-1, 7a-2, 7a-3 and 7a-4, 7b-1, 7b-2, 7b-3 and 7b-4.

As illustrated in FIG. 16 which illustrates a cross-sectional view of the optical deflector of FIG. 15, the inner piezoelectric actuators 7a-1, 7a-2, 7a-3 and 7a-4, 7b-1, 7b-2, 7b-3 and 7b-4 are constructed by the monocrystalline silicon active layer 703, the silicon oxide layer 704, the lower electrode layer 705, the PZT layer 706 and the upper electrode layer 707.

An optical deflection or horizontal scanning operation by rocking the mirror 1 with respect to the X-axis is similar to the optical deflection or vertical scanning operation by rocking the mirror 1 with the Y-axis below.

The inner piezoelectric actuators 7a-1, 7a-2, 7a-3, 7a-4, 7b-1, 7b-2, 7b-3 and 7b-4 are divided into an odd-numbered group of the inner piezoelectric actuators 7a-1 and 7a-3; 7b-1 and 7b-3, and an even-numbered group of the inner piezoelectric actuators 7a-2 and 7a-4; 7b-2 and 7b-4 alternating with the odd-numbered group of the inner piezoelectric actuators 7a-1 and 7a-3; 7b-1 and 7b-3.

In the same way as the outer piezoelectric actuators 6a-1, 6a-2, 6a-3 and 6a-4, 6b-1, 6b-2, 6b-3 and 6b-4, when the odd-numbered group of the inner piezoelectric actuators 7a-1, 7a-3, 7b-1 and 7b-3 are flexed in one direction, for example, in a downward direction, the even-numbered group of the inner piezoelectric actuators 7a-2, 7a-4, 7b-2 and 7b-4 are flexed in the other direction, i.e., in an upward direction. On the other hand, when the odd-numbered group of the inner piezoelectric actuators 7a-1, 7a-3, 7b-1 and 7b-3 are flexed in the upward direction, the even-numbered group of the inner piezoelectric actuators 7a-2, 7a-4, 7b-2 and 7b-4 are flexed in the downward direction. Thus, the mirror 1 is rocked with respect to the X-axis.

The operation of the two-dimensional optical deflector apparatus of FIG. 15 is carried out based upon the timing diagrams of FIGS. 17A, 17B, 17C, 17D, 17E and 17F and FIGS. 18A, 18B, 18C, 18D, 18E and 18F corresponding to those of FIGS. 9A, 9B, 9C, 9D, 9E and 9F and FIGS. 14A, 14B, 14C, 14D, 14E and 14F.

That is, as illustrated in FIGS. 17A, 17B, 18A and 18B, the drive voltage $V_{Xa}'$ based upon the drive data Xa' stored in advance in the nonvolatile memory 221 and the drive voltage $V_{Xb}'$ based upon the drive data Xb' stored in advance in the nonvolatile memory 222 are straight-type saw-tooth-shaped at a predetermined frequency and symmetrical or opposite in phase to each other with the reference voltage $V_{Xr}'$ based upon the reference data Xr' stored in advance in the nonvolatile memory 223. As a result, the inner piezoelectric actuators 7a-1, 7a-3, 7b-1 and 7b-3 and the inner piezoelectric actuators 7a-2, 7a-4, 7b-2 and 7b-4 carry out flexing operations in opposite directions to each other, so as to rock the mirror 1 with respect to the X-axis.

Note that the frequency of the straight-type saw-tooth drive voltages $V_{Xa}'$ and $V_{Xb}'$ is sufficiently small in order not to resonate with the natural frequency of a mechanically-vibrating system of the mirror 1 with respect to the X-axis depending upon the inner piezoelectric actuators 7a-1, 7a-2, 7a-3 and 7a-4, 7b-1, 7b-2, 7b-3 and 7b-4.

Figure 14:
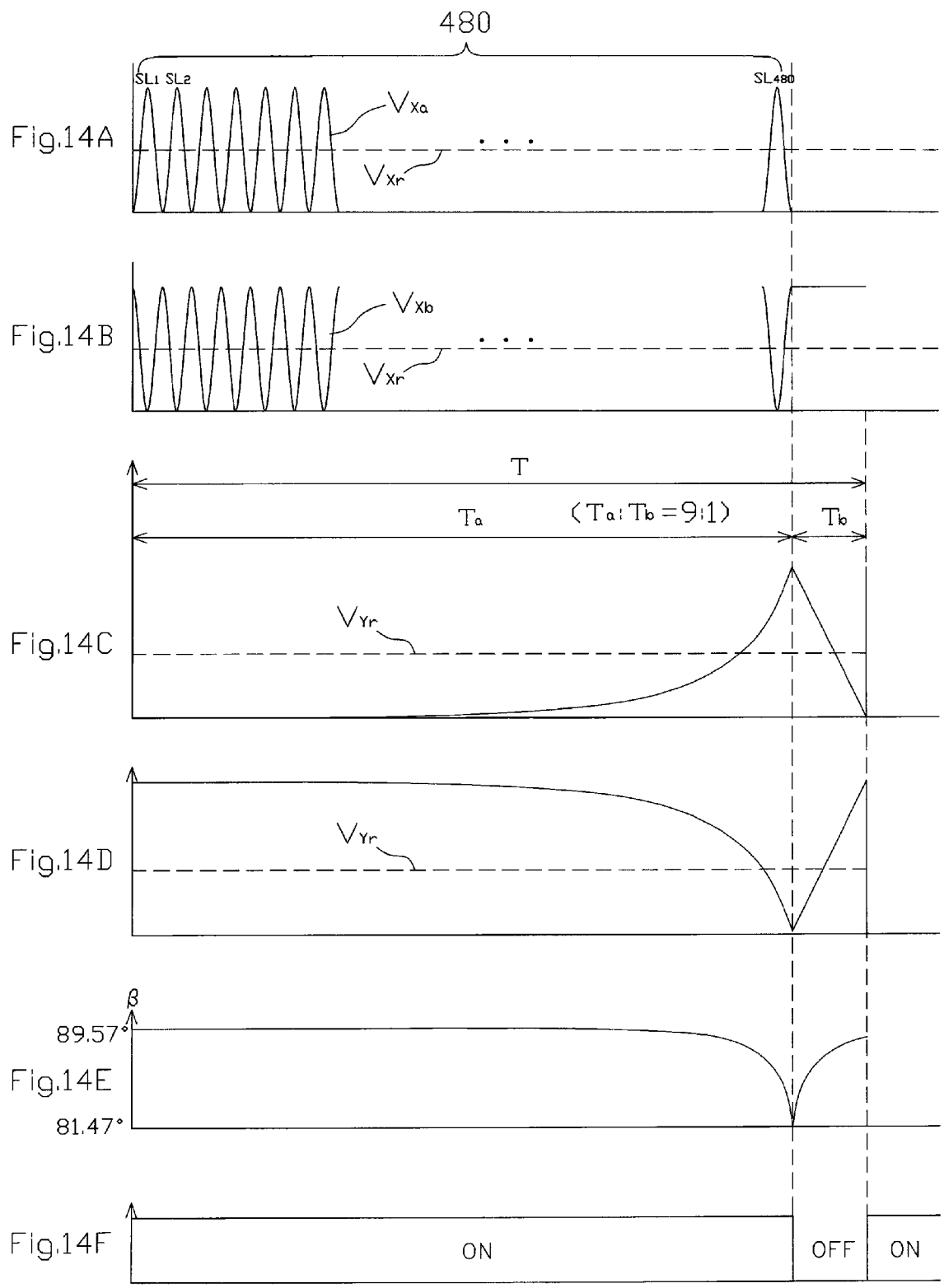
FIGS. 14A, 14B, 14C, 14D, 14E and 14F are other timing diagrams for explaining the operation of the optical deflector apparatus of FIG. 6.

Note that the curved-type saw-tooth drive voltage $V_{Y1}$ as illustrated in FIGS. 9C and 14C can be applied to the even-numbered group of the outer piezoelectric actuators 6a-2, 6a-4, 6b-2 and 6b-4, and the curved-type saw-tooth drive voltage $V_{Y2}$ as illustrated in FIGS. 9D and 14D can be applied to the odd-numbered group of the outer piezoelectric actuators 6a-1, 6a-3, 6b-1 and 6b-3.

Also, the straight-type saw-tooth drive voltage $V_{Xa}'$ as illustrated in FIGS. 17C and 18C can be applied to the even-numbered group of the outer piezoelectric actuators 7a-2, 7a-4, 7b-2 and 7b-4, and the straight-type saw-tooth drive voltage $V_{Xb}'$ as illustrated in FIGS. 17D and 18D can be applied to the odd-numbered group of the outer piezoelectric actuators 7a-1, 7a-3, 7b-1 and 7b-3.

The presently disclosed subject matter can be applied to apparatuses other than vehicle headlamps, where irregularity of illumination would occur depending upon the distance from the apparatuses.

It will be apparent to those skilled in the art that various modifications and variations can be made in the presently disclosed subject matter without departing from the spirit or scope of the presently disclosed subject matter. Thus, it is intended that the presently disclosed subject matter covers the modifications and variations of the presently disclosed subject matter provided they come within the scope of the appended claims and their equivalents. All related or prior art references described above and in the Background section of the present specification are hereby incorporated in their entirety by reference.

The invention claimed is:

1. A two-dimensional optical deflector apparatus comprising an optical deflector and a driver for driving said optical deflector,
said optical deflector including:
a mirror;
a first piezoelectric actuator for rocking said mirror with respect to a first axis of said mirror; and
a second piezoelectric actuator of a meander type for rocking said mirror with respect to a second axis of said mirror perpendicular to said first axis, said driver generating a curved-type saw-tooth drive voltage and applying said curved-type saw-tooth drive voltage to said second piezoelectric actuator.

2. The two-dimensional optical deflector apparatus as set forth in claim 1, wherein said curved-type saw-tooth drive voltage has one period formed by a rising period and a falling period,
said curved-type saw-tooth drive voltage first gradually changing and then, rapidly changing for one of said rising period and said falling period,
said curved-type saw-tooth drive voltage first rapidly changing and then, gradually changing for the other of said rising period and said falling period.

3. The two-dimensional optical deflector apparatus as set forth in claim 2, wherein each of said rising period and said falling period is half of said period, said curved-type saw-tooth drive voltage being symmetrical between said rising period and said falling period.

4. The two-dimensional optical deflector apparatus as set forth in claim 1, wherein said curved-type saw-tooth drive voltage has one period formed by a rising period and a falling period,
said curved-type saw-tooth drive voltage first rapidly changing and then, gradually changing for one of said rising period and said falling period,
said curved-type saw-tooth drive voltage first gradually changing and then, rapidly changing for the other of said rising period and said falling period.

5. The two-dimensional optical deflector apparatus as set forth in claim 4, wherein each of said rising period and said falling period is half of said period, said curved-type saw-tooth drive voltage being symmetrical between said rising period and said falling period.

6. The two-dimensional optical deflector apparatus as set forth in claim 1, wherein said curved-type saw-tooth drive voltage has one period formed by a rising period and a falling period, one of said rising period and said falling period being longer than the other,
said curved-type saw-tooth drive voltage first gradually changing and then, rapidly changing for said one of said rising period and said falling period,
said curved-type saw-tooth drive voltage rapidly changing for the other of said rising period and said falling period.

7. The two-dimensional optical deflector apparatus as set forth in claim 1, wherein said first piezoelectric actuator is of a torsion bar type,
said driver generating a sinusoidal drive voltage and applying said sinusoidal drive voltage to said first piezoelectric actuator.

8. The two-dimensional optical deflector apparatus as set forth in claim 7, wherein a frequency of said sinusoidal drive voltage is larger than a frequency of said curved-type saw-tooth drive voltage.

9. The two-dimensional optical deflector apparatus as set forth in claim 1, wherein said first piezoelectric actuator is of a meander type,
said driver generating a straight-type saw-tooth drive voltage and applying said straight-type saw-tooth drive voltage to said first piezoelectric actuator.

10. The two-dimensional optical deflector apparatus as set forth in claim 9, wherein a frequency of said straight-type saw-tooth drive voltage is larger than a frequency of said curved-type saw-tooth drive voltage.

11. The two-dimensional optical deflector apparatus as set forth in claim 1, further comprising:
a movable frame for supporting said mirror; and
a support body surrounding said movable frame,
said second piezoelectric actuator comprising:
a first group of piezoelectric actuator elements serving as cantilevers; and
a second group of piezoelectric actuator elements serving as cantilevers alternating with said first group of piezoelectric actuator elements,
said piezoelectric actuator elements being folded at every actuator element and connected from said support body to said movable frame, each of said piezoelectric actuator elements being in parallel with said first axis of said mirror,
said driver applying said curved-type drive voltage to said first group of piezoelectric actuator elements,
said driver generating another curved-type drive voltage opposite in phase to said curved type drive voltage and applying said other curved-type drive voltage to said second group of piezoelectric actuator elements.

12. The two-dimensional optical deflector apparatus as set forth in claim 1, further comprising:
a movable frame for supporting said mirror; and
a support body surrounding said movable frame,
said second piezoelectric actuator comprising a pair of third piezoelectric actuators each located opposite to each other with respect to said mirror connected between said support body and said movable frame,
each of said third piezoelectric actuators comprising:
a first group of piezoelectric actuator elements serving as cantilevers; and
a second group of piezoelectric actuator elements serving as cantilevers alternating with said first group of piezoelectric actuator elements,
said piezoelectric actuator elements being folded at every actuator element and connected from said support body to said movable frame, each of said piezoelectric actuator elements being in parallel with said first axis of said mirror,
said driver applying said curved-type drive voltage to said first group of piezoelectric actuator elements,
said driver generating another curved-type drive voltage opposite in phase to said curved-type drive voltage and applying said other curved-type drive voltage to said second group of piezoelectric actuator elements.

* * * * *